United States Patent
Scheurer

(10) Patent No.: US 8,313,147 B2
(45) Date of Patent: Nov. 20, 2012

(54) SEAT LATCH ASSEMBLY FOR A VEHICLE SEAT

(75) Inventor: Jeffrey H. Scheurer, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 254 days.

(21) Appl. No.: 12/764,652

(22) Filed: Apr. 21, 2010

(65) Prior Publication Data

US 2011/0260518 A1   Oct. 27, 2011

(51) Int. Cl.
    *B60N 2/20* (2006.01)
(52) U.S. Cl. .............................. 297/378.13; 297/378.12
(58) Field of Classification Search ............ 297/378.12, 297/378.1, 378.13; 296/65.16
    See application file for complete search history.

(56) References Cited

U.S. PATENT DOCUMENTS

| | | | |
|---|---|---|---|
| 2,559,548 A | | 7/1951 | Seigneur |
| 3,398,987 A | | 8/1968 | Lynn et al. |
| 4,639,040 A | * | 1/1987 | Fujita et al. ............. 297/378.13 |
| 5,597,206 A | * | 1/1997 | Ainsworth et al. ...... 297/378.12 |
| 7,152,924 B1 | | 12/2006 | Nemoto et al. |
| 7,338,128 B2 | | 3/2008 | Inoue et al. |
| 7,377,584 B2 | | 5/2008 | Griswold et al. |
| 7,416,254 B2 | | 8/2008 | Jennings |
| 7,494,187 B2 | | 2/2009 | Inoue et al. |
| 7,909,405 B2 | * | 3/2011 | Arima ...................... 297/378.12 |
| 7,931,338 B2 | * | 4/2011 | Lindsay ................... 297/378.13 |
| 8,172,327 B2 | * | 5/2012 | Lindsay ................... 297/378.12 |
| 2008/0061617 A1 | * | 3/2008 | Zielinski et al. ......... 297/378.13 |
| 2009/0102222 A1 | | 4/2009 | Kato et al. |
| 2009/0145183 A1 | | 6/2009 | Maeta et al. |
| 2011/0233982 A1 | * | 9/2011 | Lindsay ................... 297/378.13 |

FOREIGN PATENT DOCUMENTS

| | | |
|---|---|---|
| JP | 57151438 | 9/1982 |
| JP | 2007230276 | 9/2007 |
| JP | 2009090791 | 4/2009 |
| WO | 9312952 | 7/1993 |
| WO | 2008105120 | 9/2008 |

\* cited by examiner

*Primary Examiner* — Milton Nelson, Jr.

(74) *Attorney, Agent, or Firm* — Rankin, Hill & Clark LLP

(57) ABSTRACT

A vehicle seat has a base and a seatback pivotably connected to the base. A latch mechanism holds the seatback in an upright position. A seat latch assembly includes a release mechanism operatively connected to the latch mechanism and including a latch handle. The latch handle is rotatable between a first extended position where the latch handle extends outwardly from an outboard lateral side of the seatback, and a second retracted position where the handle is generally flush with the outboard lateral side of the seatback. Movement of the latch handle from one of the first position and the second position to the other one of the first position and second position occurs upon movement of the seatback to one of the upright position and a stowed position to provide more clearance for interior trim of the vehicle.

20 Claims, 7 Drawing Sheets

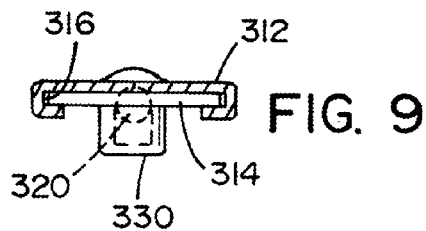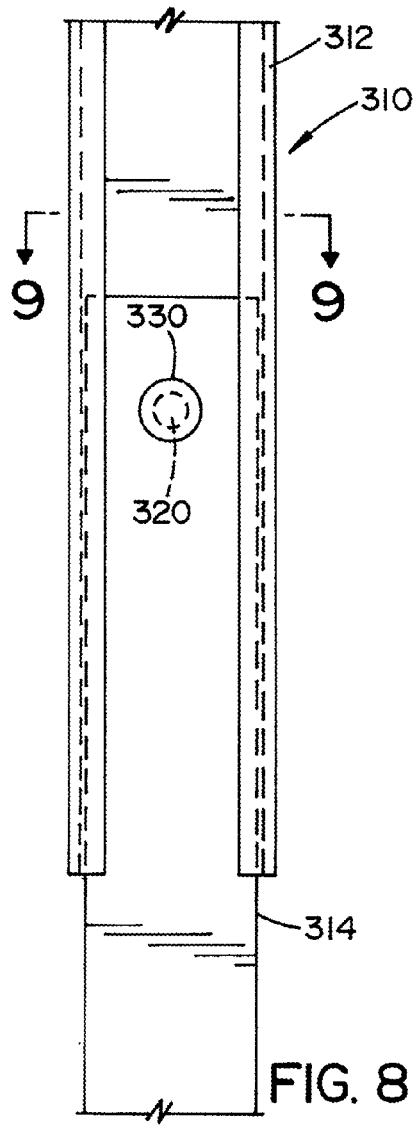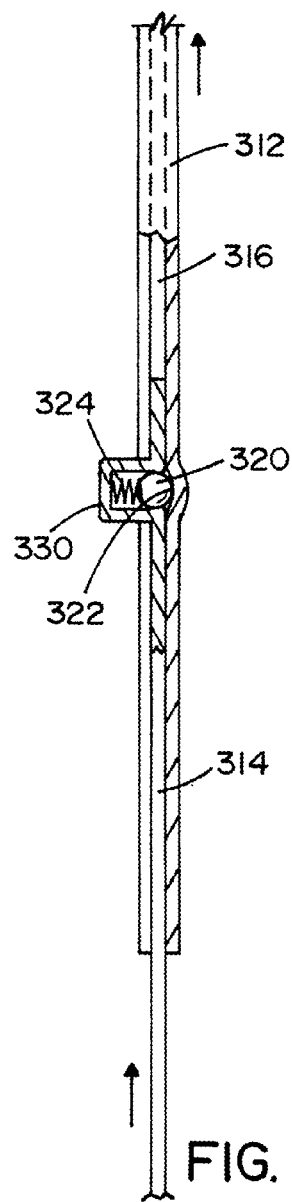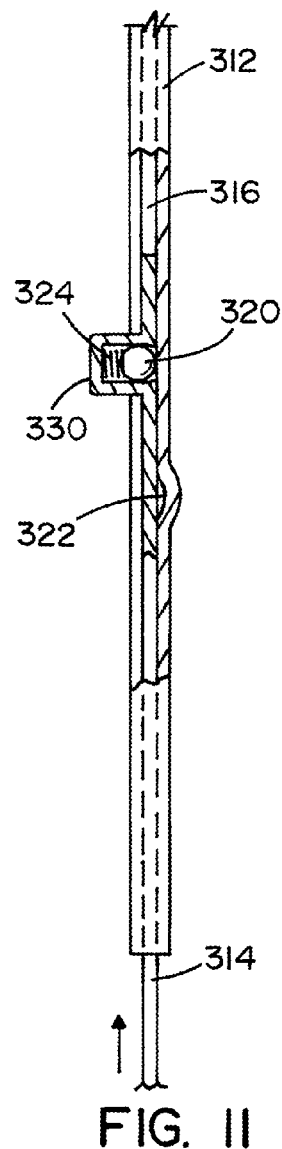

US 8,313,147 B2

SEAT LATCH ASSEMBLY FOR A VEHICLE SEAT

BACKGROUND OF THE INVENTION

Exemplary embodiments herein relate to a seat latch assembly for a vehicle seat, and more particularly, to a rapid retraction seat latch assembly configured to provide more clearance for interior trim of the vehicle as a seatback of the seat is moved between an upright, seated position and a stowed position where the seatback rests on a seat base.

A known seat in a vehicle typically includes a locking mechanism having a locking lever mounted to a seatback of the rear seat and engageable with a striker of the vehicle. A release mechanism having a release lever is engageable with the locking lever. A knob is connected to the release lever. Unlatching of the knob allows the release lever to move from a lock position to an unlock position to disengage the striker from the locking lever to allow the seatback to move from an upright, seated position to a folded, stowed position. Typically, when the locking lever is engaged with the striker, the knob is in a first position, and when the locking lever is disengaged from the striker, the knob is moved to a second position. Movement of the knob between the first and second positions is generally determined by distance of unlatching of the release lever between the lock position and unlocked position. Generally, the knob moves to the second position during rotation of the seatback to its stowed position. However, because the knob does not retract timely upon seatback rotation, the knob can interfere with or not provide enough clearance for the interior trim of the vehicle. Accordingly, to allow more clearance for interior vehicle trim, a rapidly retracting seat latch assembly is desired.

SUMMARY

According to one aspect, a seat latch assembly for a seat of a vehicle is provided. The vehicle seat has a base and a seatback pivotably connected to the base. The seatback is moveable between an upright, seated position and a stowed position where the seatback rests on the base. A latch mechanism holds the seatback in the upright position. The seat latch assembly comprises a release mechanism operatively connected to the latch mechanism and including a latch handle. The latch handle is rotatable between a first extended position where the latch handle extends outwardly from an outboard lateral side of the seatback, and a second retracted position where the handle is generally flush with the outboard lateral side of the seatback. Movement of the latch handle from one of the first position and the second position to the other one of the first position and second position occurs upon movement of the seatback to one of the upright position and stowed position to provide more clearance for interior trim of the vehicle.

According to another aspect, a vehicle seat has a base and a seatback pivotably connected to the base. The seatback has an upright, seated position, and a stowed position. The vehicle seat comprises a release mechanism including a latch handle and a lever assembly coupled to the latch handle. The lever assembly includes an unequal length lever defining a first lever arm and a second lever arm smaller than the first lever arm. The latch handle is rotatable between a first extended position and a second retracted position. As the seatback is being pivoted between the upright position and the stowed position, the unequal length lever causes nearly immediate movement of the latch handle to one of the first position and second position. A latch mechanism is operatively connected to the release mechanism for holding the seatback in the upright position.

According to yet another aspect, a vehicle seat has a base and a seatback pivotably connected to the base. The seatback has an upright, seated position and a stowed position. The vehicle seat comprises a release mechanism including a latch handle, a first arm, a second arm, and a lever for operatively connecting the first arm to the second arm. A lever defines a first lever arm and a second lever arm smaller than the first lever arm. The latch handle is rotatable between a first extended position and a second retracted position. As the seatback is being pivoted between the upright position and the stowed position, the unequal length lever causes the latch handle to move to one of the first position and second position. A take-up device is operatively associated with the second arm. A housing is located on the outboard lateral side of the seatback and receives the latch handle in the second position. As the seatback rotates from the upright position to the stowed position, slack in the second arm is taken up by the take-up device with a biasing force so that the second arm remains at a full length until the latch handle is at least substantially fully retracted and then the second arm collapses when the latch handle reaches the second position. As the seatback folds forward, the latch handle fully retracts into the latch handle housing at the beginning of the seat rotation and retraction of the latch handle is complete within a fraction of the total seatback rotation.

BRIEF DESCRIPTION OF THE DRAWINGS

FIG. 8 is a schematic view of a take-up device for the latch assembly according to yet another aspect of the present disclosure.

FIG. 9 is a cross-sectional view of the take-up device of FIG. 8 taken generally along line 9-9 of FIG. 8.

FIG. 10 is a side cross-sectional view of the take-up device of FIG. 8 in a first position.

FIG. 11 is a side cross-sectional view of the take-up device of FIG. 8 in a second position.

DETAILED DESCRIPTION

Figure 1:
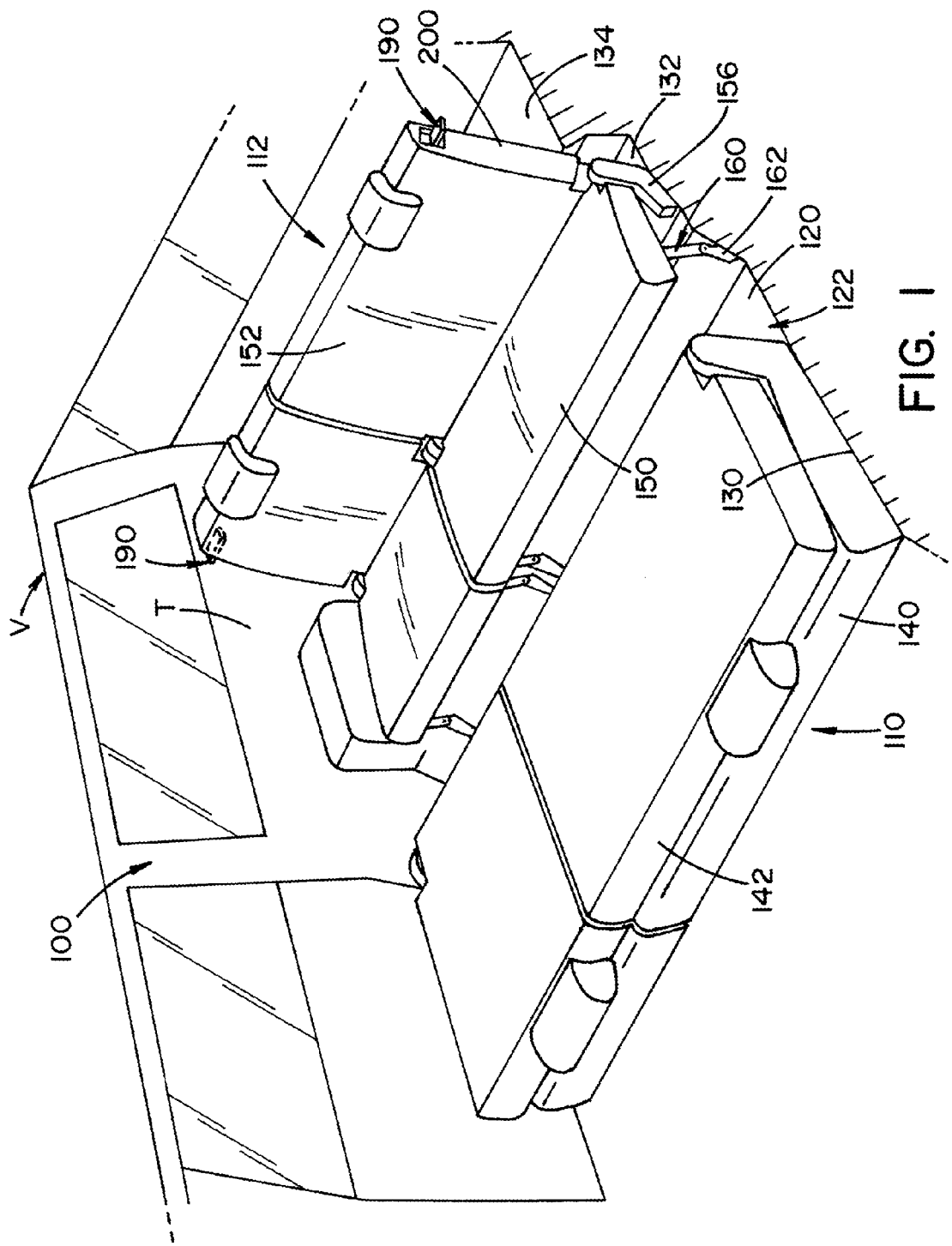
FIG. 1 is a schematic perspective view of an interior of a vehicle having a second row of seats and a third row of seats. The second row of seats is in a folded, stowed position and the third row of seats is in an upright, seated position. A seat latch assembly according to the present disclosure is provided in the third row of seats.

It should, of course, be understood that the descriptions and drawings herein are merely illustrative and that various modifications and changes can be made in the structures disclosed without departing from the present disclosure. It will also be appreciated that various identified components of the vehicle seat and seat latch assembly disclosed herein are merely terms of art and may vary from one vehicle manufacturer to another and should not be deemed to limit the present disclosure. All references to direction and position, unless otherwise indicated, refer to the orientation of the vehicle seat illustrated in the drawings and should not be construed as limiting the claims appended hereto. Like numerals refer to like parts throughout the several views.

Referring now to the drawings wherein the showings are for purposes of illustrating one or more exemplary embodiments only and not for purposes of limiting the same, FIG. 1 schematically illustrates an exemplary vehicle seating arrangement 100 adapted for use in connection with a vehicle V having an increased cargo and passenger carrying capability. The vehicle seating arrangement 100 generally comprises at least one front or first row seat or seat assembly (not shown), at least one second row or seat assembly 110 and at least one rear or third row seat or seat assembly 112. The second row seat 110 and the third row seat 112 can be a split-bench/split-back type seat; though alternative seat configurations, such as bench-type seats or separated captain-type seats, are contemplated. Each seat 110, 112 is coupled to a body 120 of the vehicle.

As shown, the vehicle body 120 includes a floor 122 which can have a series of generally horizontally disposed platforms that are placed at various levels. These platforms include a generally horizontally disposed first platform (not shown), a second horizontally disposed platform 130, a third horizontally disposed platform 132, and a fourth horizontally disposed platform 134 that extends behind the third seat assembly 112. The first platform provides a surface on which the vehicle front row seat is mounted. For passengers sitting in the second row seat 110, the first platform can serve as a foot well upon which a passenger can rest his legs or feet. The second platform 130 provides a surface on which the second row seat 110 is mounted. The second platform 130 can be raised, relative to the level of the first platform, although this is not required. The rear portion of the second platform 130 can serve as a foot well for passengers sitting in the third row seat 112. The third platform 132 is raised relative to the level of the second platform 130 (though this is not required), and provides a surface to which the third seat 112 is anchored. The fourth platform section 134 generally defines the level of the cargo carrying floor of the vehicle V. The illustrated sections 130, 132, 134 of the floor 122 are merely exemplary and thus need not be limited to what is shown herein.

The depicted vehicle seating arrangement 100 is generally used in vehicles having one or two side-mounted rear doors, in addition to the usual two front doors and possibly a tailgate member. With continued reference to FIG. 1, the second row seat 110 includes a seat cushion or base 140 for supporting a seat occupant and a seatback 142 pivotably coupled to the seat cushion 140. The seat cushion 140 is connected to a support frame (not shown) which can be movably mounted to the floor 122. To move the seatback 142 between an upright, seated position and a stowed, cargo position, the second row seat 110 can include a pivoting mechanism (not shown), which can be coupled to one or both of the seat cushion 140 and seatback 142 to bring the seatback 142 to pivot between the upright, passenger carrying position and the stowed, cargo carrying position.

Figure 2:
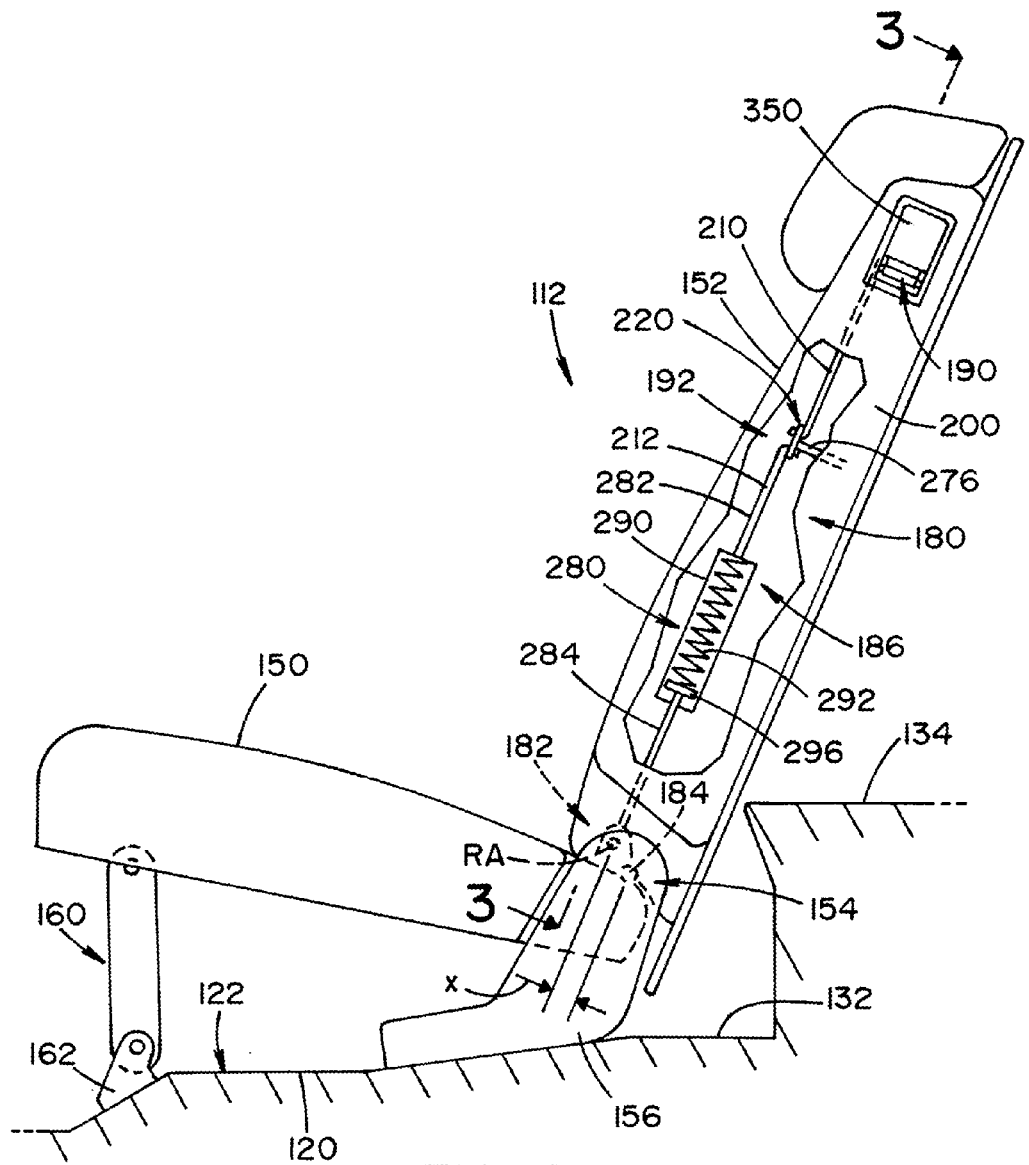
FIG. 2 is a side schematic view of one of the seats of the third row of seats, a seatback of the seat being partially broken away to schematically illustrate the operational components of the seat latch assembly of FIG. 1.

With reference to FIGS. 1 and 2, the third row seat 112 includes a seat cushion 150, also referred to as a seat base, for supporting a seat occupant. A seatback 152 is pivotably coupled to the seat cushion 150 via a pivoting mechanism 154 (shown schematically in FIG. 2) and a seat mount 156, which is also mounted to the vehicle floor. The seat cushion 150 can be pivotably connected to the vehicle body 120; although, this is not required. A front pivoting mechanism 160 connects a front section of a seat cushion frame (not shown) of the seat base 150 to a mounting bracket 162 that is affixed to the vehicle floor 122.

Figure 3:
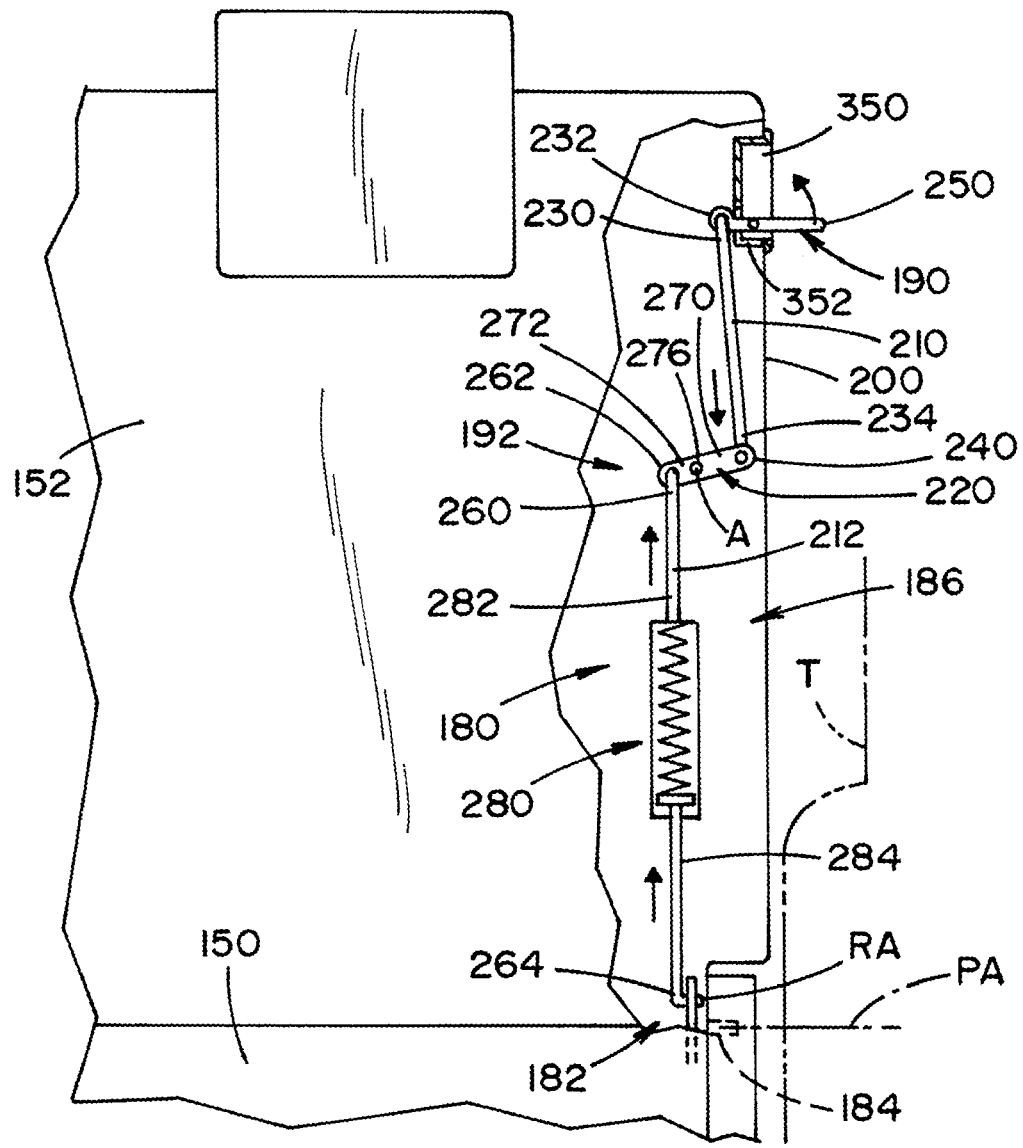
FIG. 3 is a cross-sectional view of the seatback of FIG. 2 taken generally along line 3-3 of FIG. 2.

With reference to FIGS. 2 and 3, a seat latch assembly 180 is operatively associated with a latch mechanism 182 which holds the seatback 152 in the upright position. The latch mechanism 182 is releasably secured to a striker or similar retaining member (not shown) that is located on the seat mount 156 or the seat base 150. Actuation of the seat latch assembly 180 allows the pivotable movement of the seatback 152 from the upright position to the stowed position where the seatback rests on the base 150, about an axle 184 that connects the seatback 152 to the seat base 150.

The seat latch assembly 180 comprises a release mechanism 186 including a latch handle 190 and a lever assembly 192 coupled to the latch handle. The latch handle 190 is rotatable between a first extended position (FIG. 3) where the latch handle 190 extends outwardly from an outboard lateral side 200 of the seatback 152 and a second retracted position (FIG. 4) where the latch handle 190 is generally flush with the outboard lateral side of the seatback 152, an outboard lateral edge of the handle 190 being generally coplanar with the outboard lateral side 200. As will be discussed in greater detail below, movement of the latch handle 190 from one of the first extended position and second retracted position to the other one of the first extended position and second retracted position occurs upon movement of the seatback 152 to one of the upright position and stowed position to provide more clearance for interior trim T of the vehicle V. According to one aspect, the movement of the latch handle is nearly immediate upon movement of the seatback 152. According to another aspect, retraction of the latch handle 190 is complete within a fraction of the total seatback rotation.

As shown in FIG. 3, the lever assembly 192 includes a first arm 210, a second arm 212 and a lever 220 for operatively connecting the first arm to the second arm. The first arm 210 has a first end 230 connected to the latch handle 190 near an inward end 232 of the latch handle. A second end 234 of the first arm 210 is connected to an outboard end 240 of the lever 220. The first arm 210 is moveable in an opposite direction as an outward end 250 of the latch handle 190. The second arm 212 has a first end 260 connected to an inboard end 262 of the lever 220. The inboard end 262 is opposite the outboard end 240 to which the first arm 210 connects. A second end 264 of the second arm 212 is pivotally connected to the latch mechanism 182. Downward movement of the first arm 210 results in upward movement of the second arm 212 which disengages the latch mechanism 182 from the striker or similar retaining member (not shown). The second end 264 of the second arm 212 connects to and contacts the latch mechanism 182 offset from the axle 184, which defines a pivot axis PA for the seatback 152. As seen in FIGS. 2 and 3, the lower end 264 of the second arm 212 connects with the latch mechanism 182 at a location RA that is offset a distance x from the pivot axis PA of the seatback 152. The lower end 264 of the second arm 212 can pivot about the location RA with respect to the latch mechanism 184 as the seatback 152 pivots about the pivot axis PA. Since PA is offset from RA, as the seatback 152 pivots about the pivot axis PA, the second arm 212 pushes up against the lever 220 because the distance between an axle 276 retaining the lever 220 and the pivot location RA decreases as the seatback 152 rotates forward.

Figure 4:
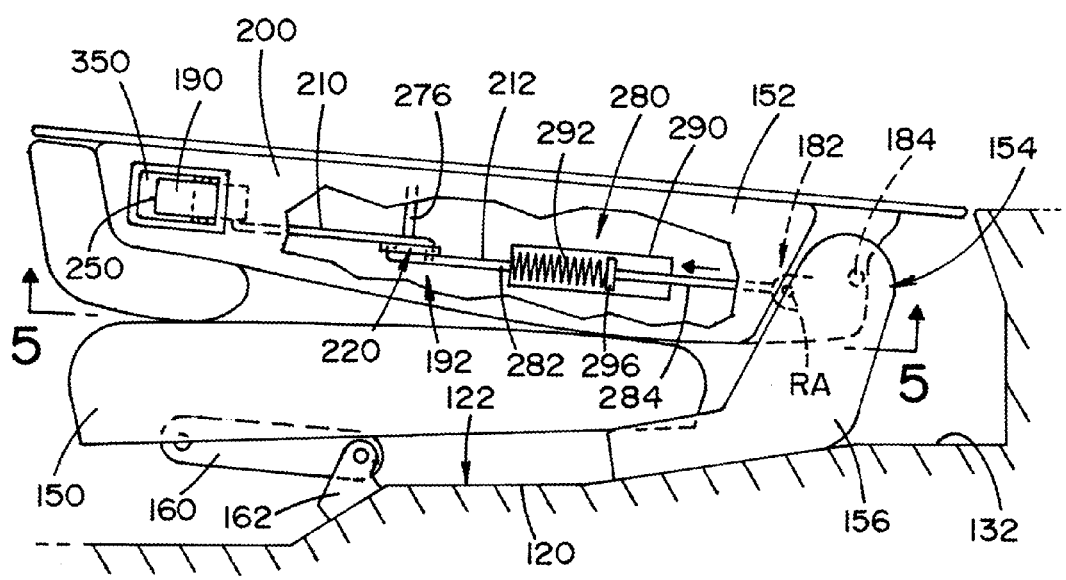
FIG. 4 is a side schematic view of the seat of FIG. 2 showing the seatback in the folded, stowed position.

In the exemplary embodiment, the lever 220 is an unequal length lever which can provide for rapid retraction of the latch handle 190 from the first position (FIG. 3) to the second position (FIG. 4). More particularly, the lever 220 defines a first lever arm 270 between a rotational axis A of the lever 220 and the connection of the second end 234 of the first arm 210. The lever 220 also defines a second lever arm 272 between the rotational axis A and the connection of the first end 260 of the second arm 212. The first lever arm 270 is greater than the second lever arm 272. The lever 220 is fixed in the seatback 152 by the axle 276, which can connect to an internal frame member in the seatback 152. As the seatback 152 is being pivoted between the upright position and the stowed position, the unequal length lever 220 can facilitate nearly immediate movement of the latch handle 190 to one of the first position and second position. The upward force exerted by the second arm 212 at the inboard end 262 of the lever 220 is less than the downward force exerted on the first arm 210 at the outboard end 240 of the lever. The smaller upward force can facilitate rapid retraction of the latch handle 190.

Figure 5:
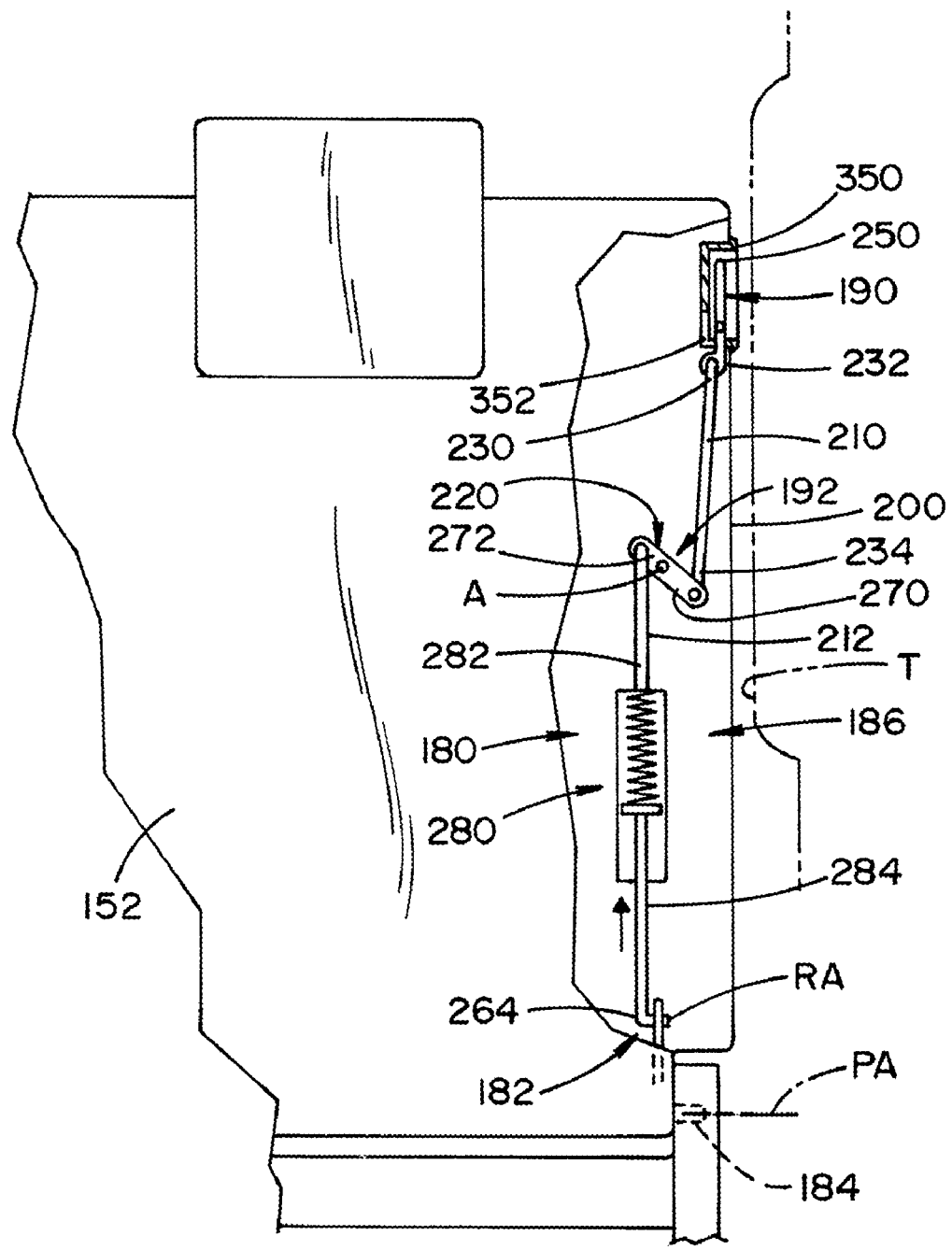
FIG. 5 is a cross-sectional view of the seatback of FIG. 4 taken generally along line 5-5 of FIG. 4.
Figure 6:
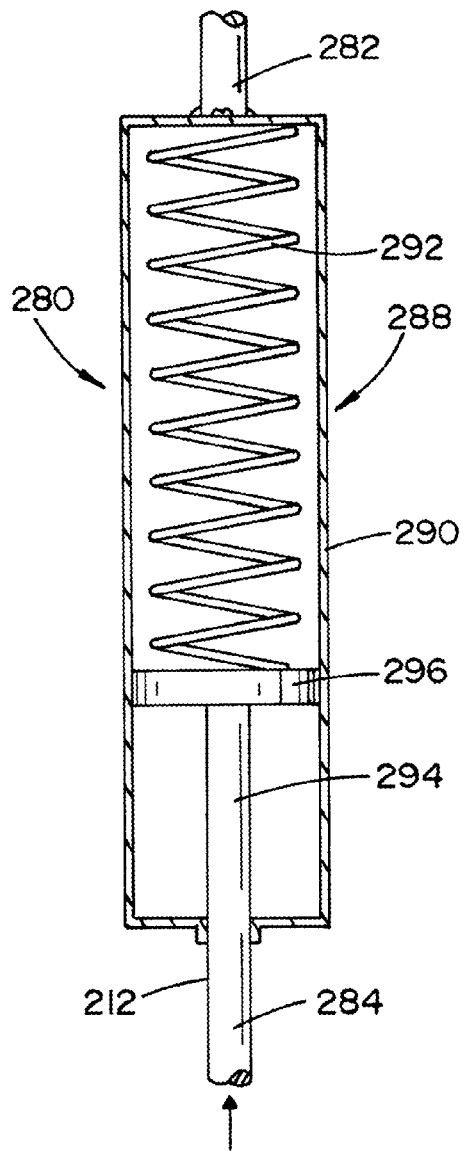
FIG. 6 is a schematic cross-sectional view of a take-up device of the seat latch assembly according to one aspect of the present disclosure.

With reference to FIGS. 2 and 5, to maintain the second arm 212 at a predetermined length until the latch handle 190 is fully retracted and to ensure that the second arm 212 at least partially collapses when the latch handle reaches the second position, a take-up device 280 is associated with the second arm. In the depicted embodiment, the take-up device separates the second arm 212 into a first section 282 and a second section 284 (see FIG. 3). The take-up device 280 is configured to maintain the second arm 212 at a predetermined length until the latch handle reaches the second position. As shown in FIG. 5, the take-up device 280 is configured to allow the second arm 212 to collapse when the latch handle is in the second position.

According to one exemplary embodiment, the take-up device 280 is a damper 288. The damper 288 includes a cylinder housing 290 having a compression spring 292 and a piston rod 294 disposed therein. The piston rod 294 forms part of the second section 184 of the second arm 212. The first section 282 of the second arm 212 is fixedly attached to the housing 290. Provided on the end of the piston rod 294 projecting into the housing 290 is a disc 296, an end of which makes contact with the compression spring 292. The other end of the compression spring 292 makes direct contact with the upper front wall of the housing 290.

When the seatback 152 is in the upright position and the latch handle 190 is in the first extended position, the compression spring 292 presses the disc 196 towards the lower wall of the housing 290. When a passenger wishes to move the seatback 152 to the stowed position where the seatback rests against the seat base 150, the user pushes the latch handle 190 upward which releases the latch mechanism 182 from the striker. As a user then pivots the seatback 152 downward, the latch mechanism 182 remains in the same general location and the second arm rotates about RA. Because of the offset distance x between RA and PA, an upward force by the second arm 212 compresses the spring 292 within the housing 290. However, since upward force can be much smaller than downward force on the lever 220, the second arm 212 remains generally the same length until the latch handle 190 retracts. This upward force acts on the second arm 212 which then rotates the lever arm in a first direction about the rotational axis A. This rotation causes the first arm 210 to move downwardly and the latch handle 190 to move immediately toward its second position. Continued rotation of the seatback 152 towards the cushion 150 allows the seatback to move to the stowed position. As the seatback 152 is then moved from the stowed position to the upright position, the biasing force of the compression spring 292 moves the piston 294 downward causing the latch mechanism 182 to reengage the striker and moving the latch handle 190 to the first extended position.

Figure 7:
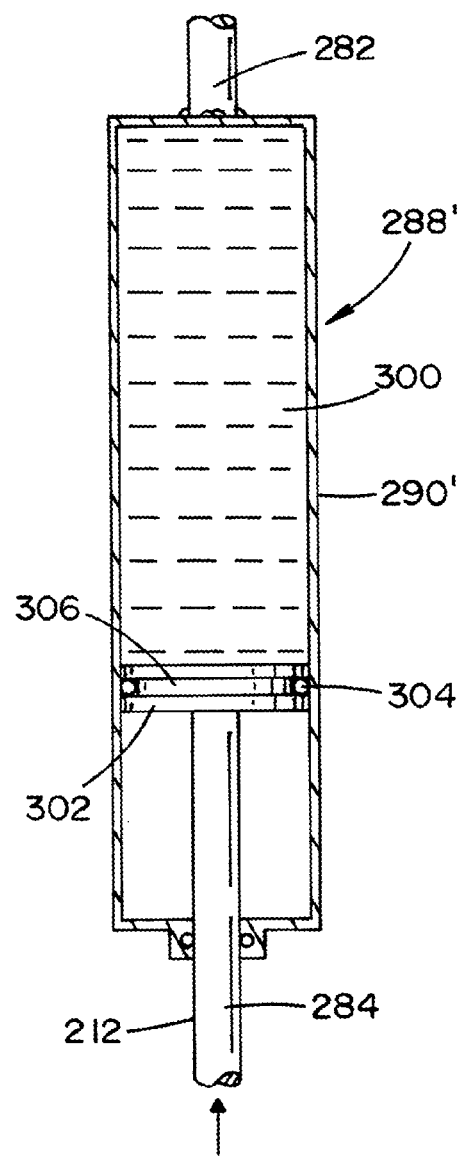
FIG. 7 is a schematic cross-sectional view of a take-up device for the latch assembly according to another aspect of the present disclosure.

An alternative exemplary embodiment of a damper 288' is shown in FIG. 7. In this embodiment, instead of the compression spring 292, a hydraulic fluid 300 is provided within the housing 290'. A disc 302 is located within the housing and is connected to the lower section of the second arm 212. The disc includes a seal 304 located within a groove 306 defined in its outer periphery to prevent the hydraulic fluid from leaking out of the housing 290'. The operation of this exemplary embodiment of the damper 288' is similar to the operation of the damper 288 described above.

With reference to FIGS. 8 through 11, another exemplary embodiment of the take-up device 280 is illustrated. In this embodiment, the take-up device 280 is a spring-loaded ball-detent sliding track 310. The track 310 includes a first track section 312 connected to the first section 282 of the second arm 212 and a second track section 314 connected to the second section 284 of the second arm. The first track section 312 is generally C-shaped and defines a slot or guide 316 for slidingly receiving the second section 314. As a force is applied to the track 310 when the latch handle 190 has moved to the second position, a ball 320 held by the second track section 314 is forced out of a detent 322 formed in the first track section 312 causing the track 310 to collapse. A spring 324 is provided in a housing 330 located on the second track section 314. The spring forces the ball 320 towards the detent 322 of the first track section 312. The operation of the sliding track 310 with respect to the movement of the seatback 152 between the upright position and the stowed position is similar to the operation of the damper 288 described above.

With reference again to FIGS. 2 and 4, the outboard lateral side 200 of the seatback 152 includes a housing 350 arranged to receive the latch handle 190 in the second position. The housing includes an opening 352 (FIG. 3). A lower end portion 232 of the latch handle 190 rotates through the opening 352 as the seatback 152 is moved between the upright position and the stowed position. In the second position, the low end portion of the latch handle is located within the seatback beneath a bottom wall of the housing 350.

As is evident form the forgoing, the subject rapid retraction seat latch assembly 180 is designed to provide more clearance for the interior trim T for a third row seat 112 as a seatback 152 of the third row seat is pivoted toward the base 150 of the third row seat. The release mechanism 186 includes the latch handle 190, first arm 210, second arm 212, take-up device 280 (for example spring damper 288, 288' or ball-detent sliding track 310), and latch mechanism 182. The latch handle 190 rotates about an axle between an extended position where the latch handle extends outwardly from the outboard lateral side 200 of the seatback 152 and retracted position where the latch handle 190 resides within the housing 350 having an outboard lateral edge generally coplanar with the outboard lateral side of the seatback. The first arm 210 attaches to the latch handle 190 near the inward end 232 of the latch handle and is moveable in an opposite direction as the outboard end 250 of the latch handle. For example, as the latch handle 190 rotates upwardly, the first arm 210 moves downwardly, and vice versa. The first arm 210 connects at its lower end 234 to the lever 220 that also rotates about an axle. The second arm 212 connects to the end 262 of the lever 220 opposite the end 240 to which the first arm 210 connects. Accordingly, downward movement of the first arm 210 results in upward movement of the second arm 212 which disengages the latch mechanism 182 from the striker or other element to which the latch mechanism is engaged when the seatback 152 is in the upright position. For the lever 220, the lever arm 270 between the axle and the first arm 210 is greater than the lever arm 272 between the axle and second arm 212. As the seatback 152 rotates from the upright position to the reclined position, slack in the second arm 212 is taken up by the take-up device 280 with a spring force so that the second arm 212 remains at full length until the latch handle 190 is fully retracted and then the second arm collapses when the latch handle reaches full retraction. Accordingly, as the seatback 152 folds forward, the latch handle 190 fully retracts into the latch handle housing 350 at the beginning of the seat rotation and retraction of the latch handle is complete within a fraction of the total seatback rotation.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A vehicle seat having a base, a seatback pivotably connected to the base, the seatback having an upright, seated position and a stowed position, and a latch mechanism for holding the seatback in the upright position, the vehicle seat comprising:
   a rapid retention seat latch assembly including a release mechanism operatively connected to the latch mechanism and including a latch handle, the latch handle being rotatable between a first extended position where the latch handle extends outwardly from an outboard lateral side of the seatback of the seat and a second retracted position where the latch handle is generally flush with the outboard lateral side of the seatback, wherein movement of the latch handle from one of the first position and second position to the other one of the first position and second position occurs upon movement of the seatback to one of the upright position and stowed position to provide more clearance for interior trim of a vehicle.

2. The vehicle seat of claim 1, wherein the release mechanism includes a first arm, a second arm and a lever for operatively connecting the first arm to the second arm.

3. The vehicle seat of claim 2, wherein the first arm has a first end connected to the latch handle near an inward end of the latch handle and a second end connected to an end of the lever, the first arm being moveable in an opposite direction as an outboard end of the latch handle.

4. The vehicle seat of claim 3, wherein the second arm has a first end connected to an end of the lever opposite the end to which the first arm connects and a second end connected to the latch mechanism, wherein downward movement of the first arm results in upward movement of the second arm which disengages the latch mechanism.

5. The vehicle seat latch of claim 4, wherein the second end of the second arm connects with the latch mechanism at a pivot location that is offset a predetermined distance from a pivot axis of the seatback, the second end of the second arm pivoting about the pivot location with respect to the latch mechanism as the seatback pivots about the pivot axis, wherein as the seatback rotates to the stowed position the distance between the lever and the pivot location decreases causing the second arm to push up against the lever.

6. The vehicle seat of claim 5, wherein an upward force exerted by the second arm at an inboard end of the lever is less than a downward force exerted on the first arm at an outboard end of the lever, the smaller upward force causing rapid retraction of the latch handle to the second position.

7. The vehicle seat of claim 4, wherein the lever is an unequal length lever providing rapid retraction of the latch handle from the first position to the second position, wherein the lever defines a first lever arm between a rotational axis of the lever and the first arm and a second lever arm between the rotational axis of the lever and the second arm, the first lever arm being greater than the second lever arm.

8. The vehicle seat of claim 4, wherein the second arm includes a take-up device configured to maintain the second arm at a predetermined length until the latch handle reaches the second position.

9. The vehicle seat of claim 8, wherein the take-up device is configured to allow the second arm to collapse when the latch handle is in the second position.

10. The vehicle seat of claim 8, wherein the take-up device is a damper.

11. The vehicle seat of claim 8, wherein the take-up device is a ball-detent sliding track.

12. The vehicle seat of claim 1, wherein the outboard lateral side of the seatback includes a housing arranged to receive the latch handle in the second position.

13. The vehicle seat of claim 12, wherein the housing includes an opening, a lower end portion of the latch handle rotating through the opening as the seatback is moved between the upright position and the stowed position, the lower end portion of the latch handle being located within the seatback beneath a bottom wall of the housing in the second position.

14. A vehicle seat having a base and a seatback pivotably connected to the base, the seatback having an upright, seated position and a stowed position, the vehicle seat comprising:
   a release mechanism including a latch handle and a lever assembly coupled to the latch handle, the lever assembly including an unequal length lever defining a first lever arm and a second lever arm smaller than the first lever arm, the latch handle being rotatable between a first extended position and a second retracted position, wherein as the seatback is being pivoted between the upright position and the stowed position, the unequal length lever causing nearly immediate movement of the latch handle to one of the first position and second position; and
   a latch mechanism operatively connected to the release mechanism for holding the seatback in the upright position.

15. The vehicle seat of claim 14, wherein in the first extended position the latch handle extends outwardly from an outboard lateral side of the seatback and in the second retracted position an outboard lateral edge of the latch handle is generally coplanar with an outboard lateral side of the seatback position to provide more clearance for interior trim of a vehicle.

16. The vehicle seat of claim 14, wherein the lever assembly includes a first arm interconnecting the latch handle and the lever and a second arm interconnecting the lever and the latch mechanism, wherein the first lever arm is between a rotational axis of the lever and the first arm and the second lever arm is between the rotational axis of the lever and the second arm.

17. The vehicle seat assembly of claim 16, wherein the first arm is moveable in an opposite direction as an outboard end of the latch handle and wherein downward movement of the first arm results in upward movement of the second arm which disengages the latch mechanism.

18. The vehicle seat of claim 16, further including a take-up device operatively associated with the second arm, the take-up device being configured to maintain the second arm at a predetermined length until the latch handle reaches the second position and allow the second arm to collapse when the latch handle is in the second position.

19. The vehicle seat of claim 14, wherein an outboard lateral side of the seatback includes a housing arranged to receive the latch handle in the second position, wherein in the second position the latch handle is generally flush with the outboard lateral side of the seatback.

20. A vehicle seat having a base and a seatback pivotably connected to the base, the seatback having an upright, seated position and a stowed position, the vehicle seat comprising:
- a release mechanism including a latch handle, a first arm, a second arm and a lever for operatively connecting the first arm to the second arm, the lever defining a first lever arm and a second lever arm smaller than the first lever arm, the latch handle being rotatable between a first extended position and a second retracted position, wherein as the seatback is being pivoted between the upright position and the stowed position, the unequal length lever causes the latch handle to move to one of the first position and second position;
- a take-up device operatively associated with the second arm; and
- a housing located on the outboard lateral side of the seatback to receive the latch handle in the second position;
- wherein as the seatback rotates from the upright position to the stowed position, slack in the second arm is taken up by the take-up device with a biasing force so that the second arm remains at full length until the latch handle is at least substantially fully retracted and then the second arm collapses when the latch handle reaches the second position,
- wherein as the seatback folds forward, the latch handle fully retracts into the latch handle housing at the beginning of the seat rotation and retraction of the latch handle is complete within a fraction of the total seatback rotation.

* * * * *